Patented Oct. 30, 1934

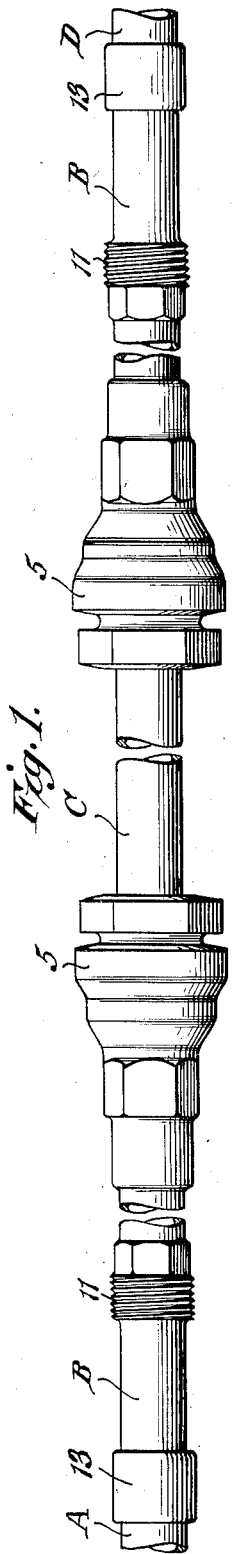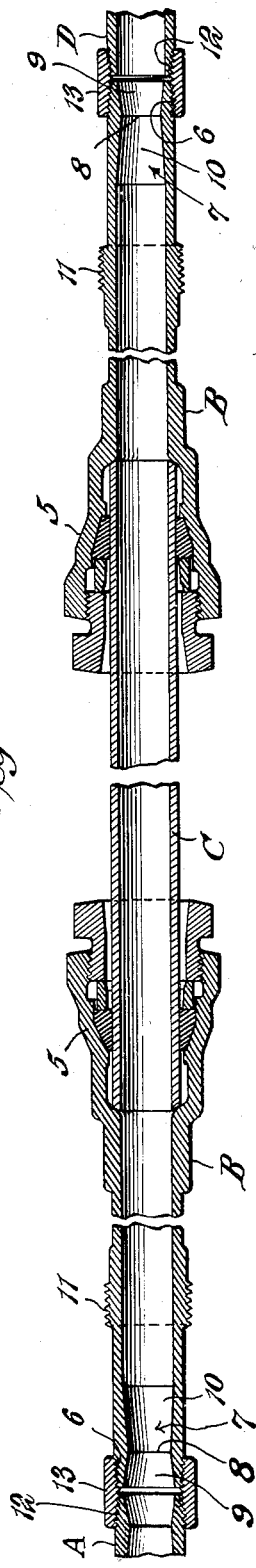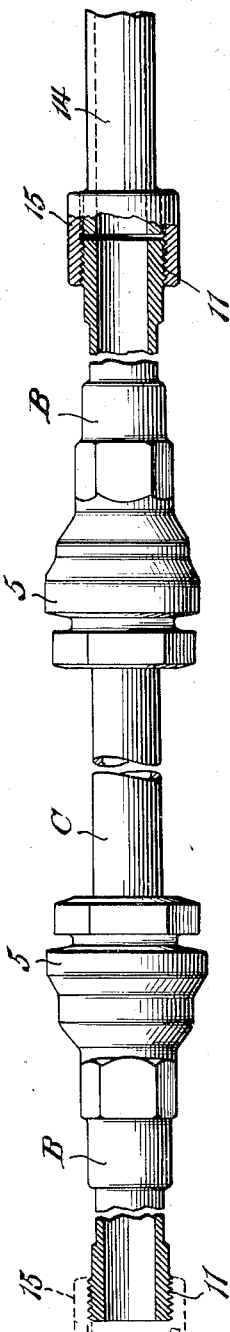

1,978,547

UNITED STATES PATENT OFFICE 1,978,547

PIPE JOINT

James R. McWane, Birmingham, Ala.; A. T. McWane, William McWane, and Jelks H. Cabaniss, executors of said James R. McWane, deceased, assignors to McWane Cast Iron Pipe Co., Birmingham, Ala.

Application May 25, 1933, Serial No. 672,885

1 Claim. (Cl. 285—146)

This invention relates to new and useful improvements in threaded pipe joints generally, although more particularly to joints for cast iron pipes.

Cast iron pipes are being employed extensively for carrying water, gas, oil, air and the like. Most of these pipe lines are buried in the ground, and practice has demonstrated that these pipe lines are often subjected to vertical strains, such as strains created by the sinking of the ground. These strains result in the bending of the pipes, and this bending action sometimes causes breaks to occur at the pipe joints. Practice has demonstrated that these joints break at or adjacent the inner end of the thread because it is at this point where the strain is greatest. Heretofore, this breakage has been avoided by increasing the thickness of the stock at the end of the pipe, the stock either (1) projecting outwardly beyond the normal circumference of the pipe, or (2) inwardly within the primary diameter of the pipe. Each of these methods is objectionable. In the first instance an oversized thread and a complementary fitting is required, and in the second instance although a primary thread is employed, the reduced diameter of the pipe not only results in a restricted flow through the line, but also results in the creation of a pocket between the ends of such pipe sections which collects the condensation if the pipe is used for conveying gas and thereby reduces the working diameter of the pipe to that extent. These conditions have resulted in the necessity of manufacturing both constructions of pipe sections and in maintaining an adequate supply on hand to meet the demands.

Among the several objects of my invention are to provide a pipe section which may be employed for use in conveying water, gas, air, oil or the like and which will therefore be free from the objections noted above; and to provide such a pipe section which is normally to be used with nominal thread joint fittings, but which may be adapted readily for use with fittings having oversized threads.

With these and other objects in view which will more fully appear, the nature of the invention will be more clearly understood by following the description, the appended claim, and the several views illustrated in the accompanying drawing.

In the drawing:—

Figure 1 is an elevation of a pipe line embodying my invention,

Figure 2 is a longitudinal sectional view thereof, and

Figure 3 is a view similar to Figure 1 but showing the ends of the pipe sections connected to joint fittings having oversized threads.

Like reference numerals designate corresponding parts throughout the several figures of the drawing.

Referring to the accompanying drawing and particularly to Figures 1 and 2 thereof, I have shown a pipe line which includes metal pipe sections A, B, C, B and D which are arranged in alinement in the order named. The intermediate section C is connected to the spaced sections B, B through the medium of pipe joints of the packing type indicated generally at 5, 5. The pipe sections B, B are of like construction and therefore a description of one of the sections will be sufficient. The outer end of each pipe section B is provided with a primary thread 6 and the metal stock at said end is thickened inwardly to form a resultant Venturi opening 7, the restricted opening 8 thereof being located adjacent the inner end of said primary thread 6, thereby increasing the normal thickness and tensile strength of the pipe at that point to a degree sufficient to prevent the pipe joint from breaking when placed under vertical strain. The venturi 7 on opposite sides of the restricted opening 8 is formed with oppositely flared portions 9 and 10, and the outer ends of the flared portions terminate in diameters equal to the internal or normal diameter of the pipe.

Formed on each pipe section B adjacent to but spaced from the primary thread 6 is an oversized thread 11.

The pipe section A is provided with a primary thread 12, and the meeting ends of the adjacent pipe sections A and B are joined by a coupling 13 which engages the primary threads 12 and 6. A similar connection is made between the other pipe section B and the pipe section D.

Thus, by forming the pipe B with a Venturi opening, a primary thread can be employed, the threaded end of the pipe will have its tensile strength increased sufficiently to avoid the joint from breaking when placed under vertical strain, the same volume of fluid will flow through the pipe as in a pipe having a uniform diameter throughout its length, and without an increase in pressure, and a pipe is thus created which meets the requirements for conveying any fluid. If the pipe sections B are employed in a line for conveying a liquid or gas, the liquid or the gas condensation will collect between adjacent Venturi openings due to the pocket being formed between the restricted openings 8. Under these circumstances, it is only necessary to cut off the outer ends of the pipe sections so as to leave the oversized threads 11 at the ends, and then join other pipe sections 14 by means of couplings 15, 15 as shown in Figure 3.

It is of course to be understood that the details of structure and arrangement of parts may be variously changed and modified without departing from the spirit and scope of my invention.

I claim:—

A pipe line section having an end provided exteriorly with a primary thread and having said end provided with a Venturi opening, the portion of maximum restriction of said Venturi opening being of a diameter less than the normal diameter of the pipe and being disposed substantially at the inner terminus of said primary thread, said pipe section also having an oversized thread formed exteriorly thereon at a point adjacent to but spaced from said primary thread and adapted for use to the exclusion of said normally threaded end upon severance of the section at the outer terminus of said oversized thread.

JAMES R. McWANE.